United States Patent Office 3,024,117
Patented Mar. 6, 1962

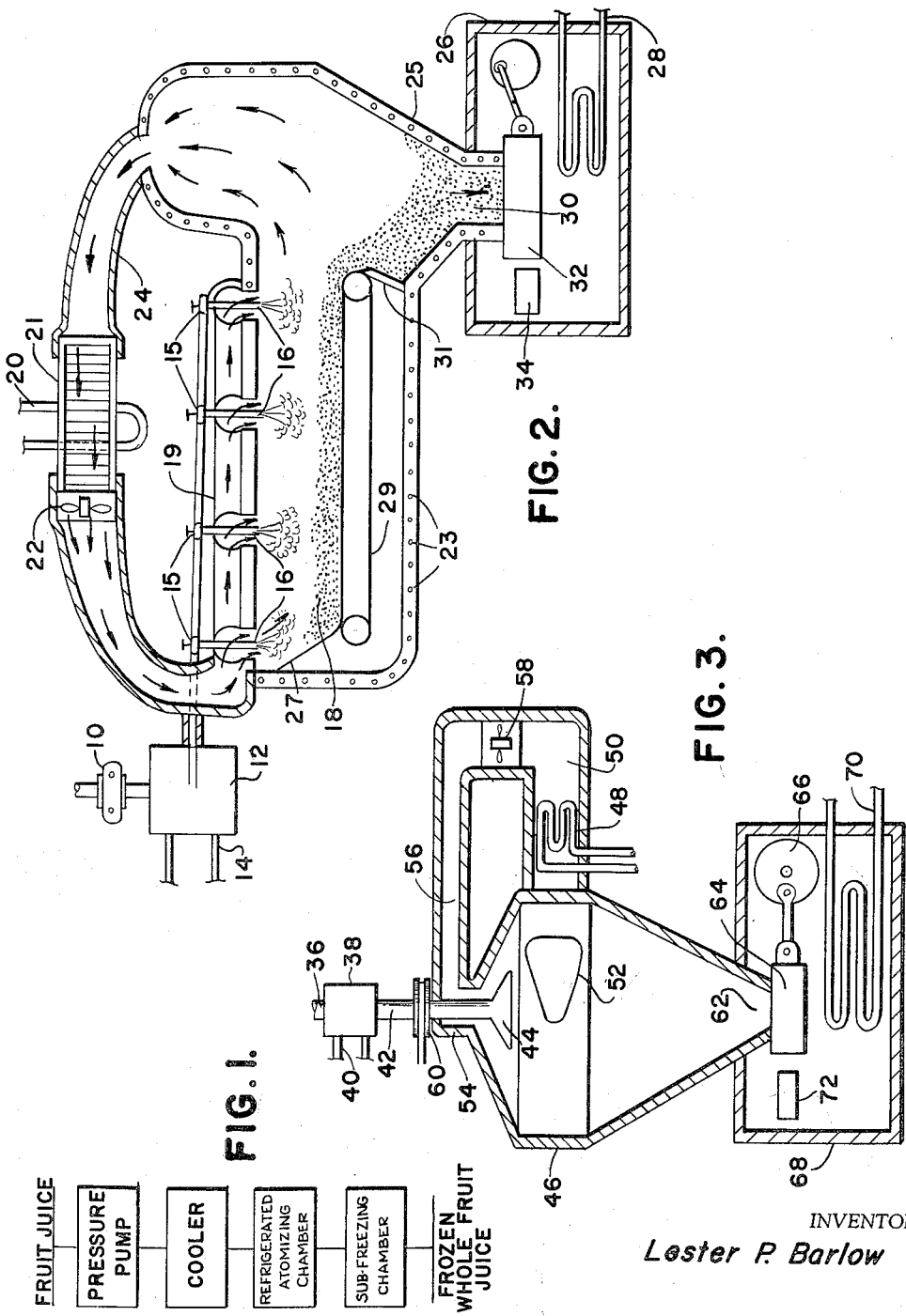

3,024,117
METHOD OF FREEZING CITRUS FRUIT JUICES
Lester P. Barlow, Shoreham, Vt., assignor to Bar-Rup Corporation, Stamford, Conn., a corporation of Connecticut
Filed Nov. 17, 1958, Ser. No. 774,263
5 Claims. (Cl. 99—206)

This invention relates to a method of preserving liquid foodstuffs and more particularly relates to a method of freezing citrus fruit juices in such a form that when thawed they return to their original state.

At the present time the manner in which fruit juices are frozen is to take whole vats of liquid fruit juices and to freeze them as a unit. In the process of freezing, the sweets of the juices are the last to freeze and freeze as a concentrated syrup in the block of fruit juice. The temperature at which the juices are frozen and preserved is generally on the order of −25° F. However, even at this temperature, the syrup is not frozen solidly and is subject to oxidation. This causes the juice to lose its sweetness and, as a consequence, the juice must be carefully sheltered to prevent the block of the whole frozen juices from coming in contact with oxygen in the atmosphere. Transportation of the whole frozen juices at a temperature at about −25° F. is a problem and the juices cannot be stored in conventional home freezers, which imposes an extreme limitation on the salability of the product.

Reference is made to a book by J. B. S. Braverman entitled "Citrus Products" published by Interscience Publishers, Inc., New York, 1949, at pages 104-105. This publication points out that the characteristic aroma and flavor of fresh orange juice appears to be due to certain substances within the juice which are distinctly different in composition from the oils of the corresponding peel. It goes on to state that oil deposits are present in the juice sacs of most citrus varieties. This oil flavors the fruit and contains volatile constituents which are very soluble in water. They include ethyl alcohol, acetone, acetaldyhyde, and formic acid. The oils also contain constituents which are less soluble in water such as olefin alcohol, $C_{10}H_{18}O$, and amyl (probably isoamyl) alcohol, phenylethyl alcohol, and esters of formic, acidic, and caprylic acids. Experiments indicate that these flavoring oils are carried in emulsified form in the ratio of about 4.4 parts per million of the flavoring juice by weight.

The change in flavor in fruit juices, such as orange juice and pineapple juice, brought about by processing, is greatly increased by oxidation. At first the fruit juice loses its fresh flavor and then progressively becomes flatter in taste until it finally loses all of its flavor.

According to the present invention it has now been found that by utilizing a novel freezing process, it is possible to freeze whole fruit juice in such a manner that it returns to its original emulsified condition upon thawing without encountering any substantial detrimental effects on flavor or material loss in stability. While a theoretical basis or explanation of the success of this new process is herewith set out, it is to be understood that this represents only the inventor's best present understanding of the phenomenon and that, aside from the process herein described and claimed, it is not intended that the invention be limited to any specific theoretical explanation of why the process is successful or why it provides markedly superior results to prior processes.

It is believed that the prevention of the rupture of the globules in citrus juice, and thus the prevention of subsequent separation of the flavor producing oils upon thawing, is more than simply a question of rapidity of freezing, and that it is related to the prevention of the formation of even smaller water crystals in an environment which permits these crystals to rupture the globules. It has been found that not only is it necessary to prevent the formation of large water crystals, such as occur when a body of citrus juice is slowly frozen, but it is also necessary to prevent the formation of even small crystals in close contact with one another.

If the citrus juice can be separated into small particles at the time of freezing, not only it is impossible for large water crystals to form, but it is also impossible for the globules by compressing them against adjacent crystals, however small. Once the fruit juice has been frozen into extremely minute particles of this nature without the rupture of the globules, it may be collected into containers and compressed for storage or shipment under refrigeration. The size of the particles of citrus juice at the time of freezing and their physical position with relation to other particles are the factors which determine whether or not the fruit juice will thaw in an emulsified or in a separated state, and it has been found that this division of fruit particles must be extremely fine and should be even smaller than flake form.

It is accordingly a primary object of the present invention to provide a novel process of preserving citrus fruit juices by freezing wherein the fruit juice is returned to its original state upon thawing.

It is another object of the present invention to provide a novel method of preserving whole citrus fruit juice wherein the fruit juice is frozen in an extremely minute particulate and unconfined form and is then packaged for storage or shipment.

It is another object of the present invention to provide a novel method of preserving whole citrus fruit juice where the fruit juice is frozen in an extremely minute particulate form wherein each particle is spaced from each other particle.

It is another object of the present invention to provide a novel method of preserving whole citrus fruit juice where the fruit juice is frozen in an extremely minute particulate form and is then compressed to exclude gas from the interior of the compressed fruit juice.

These and further objects and advantages of the present invention shall become more apparent upon reference to the following specification and claims and the appended drawing in which:

FIGURE 1 is a block diagram of the process of my invention;

FIGURE 2 is a diagrammatic illustration of an apparatus for carrying out the process according to one embodiment thereof; and FIGURE 3 is a diagrammatic illustration of another apparatus for carrying out the process according to another embodiment of the invention.

According to my invention whole fruit juice under that refrigeration necessary to prevent deterioration or spoilage is placed under pressure by means of any suitable pump. Pressurizing the fruit juice in this manner makes it possible to reduce its temperature below its normal unpressurized freezing point without causing a freezing of the fruit juice. The temperature of the fruit juice is then reduced to a point below its atmospheric pressure freezing point and in this pressurized refrigerated condition is fed into a very low temperature refrigerating chamber through one or more atomizing nozzles each of which disperses the fruit juice into a fine spray of extremely minute particles. The release of the pressure at the low temperature which exists in the refrigerated chamber results in an instantaneous freezing of the fruit juice while it is suspended in the gas in the refrigerating chamber. Because the fruit juice is in an extremely subdivided condition and because each minute particle is separated by a gas space from each other minute particle, two effects are achieved. First, the formation of large water crystals is prevented, and, second, the small crystals which probably do form are prevented from destroying the globules because they are unable to compress the globules against other solid crystals.

It is necessary that the atomizing head produce extremely small particles of liquid, preferably a fog or mist as those terms are defined in industry. See Johnson and Auth "Fuels and Combustion Handbook," 1951, pages 465–466. Preferably the particles of liquid should be frome one-half to five hundred microns in diameter. While it is desirable that the majority of particles fall within this size range, the existence of a small number of larger particles does not have any substantial adverse effect. The particles must freeze while they are spaced from one another and preferably freeze in from one one-hundredth to one two-hundreths of a second after leaving the atomizing nozzle at which time they are moving at a speed of approximately one hundred miles per hour. With the juice particles travelling at that speed and frozen at that rate, the juice is frozen in less than five feet of travel from the pressure nozzle. The freezing chamber is made large enough to prevent any juice particles from contacting any wall of the chamber before it is frozen. The minute particles of frozen fruit juice settle by gravity to the bottom of the refrigerated chamber and are removed with the aid of a conveyor into a further chamber which is maintained at a temperature below the atmospheric pressure freezing point of fruit juice and preferably at about the same temperature that exists in the refrigerating chamber. Here the particles are collected and packed into containers by any suitable method.

The refrigerated atomizing chamber is sealed from the atmosphere and contains an inert, non-oxidizing gas such as nitrogen, helium, etc. Sterilized refrigerated air will not suffice because the presence of oxygen will cause oxidation and deterioration of the fruit juice. The temperature of this chamber is maintained at a value which causes instantaneous freezing of the atomized liquid, preferably between −10° and −50° F. Maximum life and stability of the product has been obtained at a temperature of −25° F. At temperatures above −10° F. it has generally been found difficult to produce the rapid freezing desired within the short period and physical space available, while temperatures below −50° F. produce deleterious effects upon the fruit juice and cause a loss in stability. The particular refrigerating gas which is used may be recirculated, so that even where this gas is relatively expensive, cost is not excessive since it is unnecessary to utilize large volumes of the gas.

The powdered frozen fruit juice removed from the refrigerated atomizing chamber may conveniently be compressed into bricks or blocks which may be sealed into wax paper cartons for shipment in a refrigerated condition.

According to a preferred embodiment of my invention, this compression is carried to a stage at which any gas between the frozen particles is expelled. Under these circumstances there are no internal pockets which air can enter and tend to spoil the fruit juice. The fruit juice thus packed may be stored indefinitely and can obivously be shipped over extremely long distances so long as thawing is prevented. It will be recognized, of course, that once the fruit juice has thawed, conventional refreezing by customary methods will result in a loss of flavor for the fruit juice. The bricketting process may be carried out by a suitable apparatus, such as the apparatus shown, for instance, in United States Patent 663,502.

While my process as just described calls for refrigerating the fruit juice below its atmospheric pressure freezing point prior to atomizing, it is also contemplated that refrigeration below this specific point may be dispensed with and that the fruit juice in a cooled condition may be atomized in a refrigerated chamber. Under such circumstances the fruit juice prior to atomization is maintained at a temperature above its atmospheric pressure freezing point but cool enough to prevent deterioration.

Referring to FIGURE 2 there is shown one form of apparatus for carrying out the process of my invention according to one embodiment thereof. Referring to that figure it will be seen that fruit juice at a temperature above freezing but sufficiently low to prevent deterioration, as for example, a temperature of approximately 40° F., is fed to a pressure pump 10 which places the fruit juice under a pressure which depresses its freezing point, as for example, a pressure of one hundred pounds per square inch. The fruit juice at this high pressure is fed into a cooler 12 where the temperature of the fruit juice is reduced by some refrigerating means such as coil 14 to a temperature of a few tenths of a degree Fahrenheit below the freezing point of the fruit juice at atmospheric pressure. The fruit juice under pressure is then sprayed through one or more atomizing nozzles 16 as controlled by the setting of valves 15 associated with the individual nozzles. The fruit juice is sprayed into a refrigerated atomizing chamber 18 in the form of a mist or fog of extremely minute particles.

The atomizing nozzles 16 extend through ports in a conduit 19 which ports also serve to admit a refrigerated inert gas into the refrigerated atomizing chamber 18. Any number of atomizing nozzles 16 may be employed. They are individually removable so that any one may be removed for any reason, such as for cleaning, while operating the freezing operation continuously. The temperature in the refrigerated atomizing chamber 18 is maintained at −10° to −50° F. and preferably approximately at −25° F. This temperature may be created and maintained by any suitable means, such as a cooling coil 20, heat exchanger 21 and a recirculating fan or turbine 22 which recirculates the gas in the chamber about the baffle 24, through the heat exchanger 21 and through a conduit 19 formed with outlet ports surrounding the individual atomizing nozzles 16. The flow of the refrigerated inert gas is at the low pressure of the fan or turbine 22 and serves as a carrier of heat. The walls of the chamber 18 are refrigerated by circulating a refrigerant through pipes 23 embedded in the walls.

The individual particles in the atomized fruit juice fog freeze immediately in the refrigerated atomizing chamber because of the low temperature therein and also because of the pressure release. These frozen particles gravitate downwardly guided by any suitable baffle 27 onto a flexible belt 29 of a conveyor from which they are deposited into a chute 25 at the bottom of the refrigerated atomizing chamber 18. The material used for the belt 29 must be of a material which will withstand the cold atmosphere to which it is subjected. A belt composed of nylon cloth filled with light plastic nylon has proven to be quite satisfactory for this purpose. The lower portion of the chute is enclosed in a further cooled chamber 26 which is also maintained below the freezing point of the fruit juice and preferably at a temperature about equal to that in the refrigerated chamber. This temperature may be secured by any suitable cooling means such as coil 28. The frozen powdered whole fruit juice issuing from the mouth 30 of the chute 25 is fed to a suitable bricketting mechanism 32 which may be of the same type as shown in U.S. Patent 663,502. This device produces bricks or blocks of frozen fruit juice 34 which may be removed from the cooled chamber 26 by any suitable means, not shown.

The pressure of bricketting is adequate to exclude gas from between the particles of fruit juice and may be in the order of 500 pounds per square inch. The bricks may be packaged in waxed cartons or in any other desired manner. While the apparatus in FIGURE 2 as herein described provides a pre-atomization refrigeration below the atmospheric freezing point of the fruit juice, this may be dispensed with and the cooler 12 may be used simply to maintain a temperature slightly above this point, or approximately 33° F.

Referring to FIGURE 3 there is shown another form of apparatus for carrying out the process of my invention according to another embodiment thereof. Referring to that figure the fruit juice is fed into an inlet pipe 36 which passes through a heat exchanger 38 whose temperature is controlled by any suitable means, such as a coil 40. From here the fruit juice passes to the inlet 42 of a rotating spray head 44 in a spray dryer type apparatus 46. The temperature in the vessel 46 is maintained low enough to cause instant freezing of the liquid. This may be accomplished in any suitable manner such as by means of a cooling coil 48 in a conduit 50 which supplies gas to the vessel 46 through a tangential inlet 52. A gas take off is provided at the top of the vessel at 54 and this is connected by conduit 56 to a fan 58 which provides for circulation of the gas. Spray head 44, which may be of any conventional type which will produce a fog or mist, is driven by any suitable means such as pulley 60.

The outlet 62 of the vessel 46 feeds into a bricketting mechanism 64 driven by eccentric 66 and this is enclosed in a chamber 68 which is maintained at a below freezing temperature by any suitable means such as coil 70. The brickettes 72 are removed from the chamber 68 by any suitable means, not shown.

In this embodiment of my invention the liquid being frozen passes into the cold zone in vessel 46 while still in the pipe 42. Since it is essential to my process that no freezing of the liquid occur until it is dispersed into a fog or a mist the heat exchanger 38 is used to bring the liquid to a temperature sufficiently high to prevent freezing until it is dispersed into small droplets by the spray head 44. Any suitable inert gas may be used for cooling the vessel 46, such as nitrogen or helium.

One very important and salable feature of the present invention is that after the fruit juice has been frozen, it may be stored at temperatures now used in transportation and commercial operations with frozen food. Also home freezers may be used for storing. The low temperatures of from $-10°$ F. to $-50°$ F. are used only to obtain the extremely fast freezing action required to freeze the fruit juice solidly before it contacts any surface. Since there is no concentration of the sweets of the juices by this method of freezing, it is not required to hold the frozen juice below standard commercial refrigerating temperatures as described above. Once the fruit juice is thawed or defrosted, it should be used promptly since the freezing has no preservative action over and above that obtained in ordinary low temperature storage. Holding the defrosted fruit juice at a temperature of 36° F. is not effective for preserving it longer than a few days.

Only an inert fluid gas can be used in the method of freezing according to the present invention because the original chemical structure of the juice must not be changed when it is returned to its liquid form. If any of the hydrocarbon gases are used, a taste foreign to the natural taste of the fruit juice will be present when the juice is melted, it having been found that even carbon dioxide gas produces a foreign taste.

In all instances a relatively slow thaw is desirable until a point just below the freezing point is reached. This prevents a possible refreezing of interior portions of the brickette if the ambient temperature should suddenly drop.

As a specific example of the present invention, whole fresh orange juice was supplied by a well known commercial supplier which previously had been freezing whole vats of the liquid orange juice as described earlier in the specification. This orange juice was frozen in the manner set forth in this specification and then stored at 10° F. for a period of four months. When the frozen juice was thawed, it exhibited all of its original flavor without any trace of foreign taste or flavors.

It will be apparent from the foregoing that a process of freezing fruit juices has been provided which permits the fruit juices to be stored and subsequently thawed in substantially its original condition while retaining its original taste and nutritional values. Since there is no concentration of the sweets of the juices in the disclosed process, it is not necessary to hold the frozen juice at temperatures below the standard temperatures used in the transportation and commercial operations with those foods. Also home freezers are practical for storing juices prepared in accordance with the present invention.

While certain specific apparatus has been shown for carrying out the process, it is to be understood that other apparatus could be used and that the apparatus shown is intended to be illustrative and not restrictive in nature. Thus, while the cold vessel has been shown as containing a circulating gas, it is also possible to operate this container under a vacuum.

This application is a continuation-in-part of my copending application Serial No. 667,312, filed June 20, 1957, now abandoned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of freezing fruit juice which comprises the steps of circulating an inert non-oxidizing gas in a continuous stream into a freezing chamber and through the chamber and out of the chamber at a pressure effective to maintain said gas in a gaseous state prior to its entry into said chamber and throughout its flow through the chamber, cooling the gas prior to its entry into the chamber sufficiently to maintain the gas at a temperature between $-10°$ F. and $-50°$ F. while in the chamber, and discharging into said gas stream in the chamber fruit juice in individual droplets sufficiently small to freeze individually substantially instantaneously upon contact with said gas.

2. A method of freezing fruit juice which comprises the steps of introducing into a freezing chamber a cold inert gas which is non-detrimental to the fruit juice and maintaining the temperature of said gas in the chamber between substantially $-10°$ F. and $-50°$ F., and discharging into said cold gas in the chamber fruit juice in discrete droplets of a size sufficiently small to freeze individually substantially instantaneously upon contact with said gas.

3. A method of freezing fruit juice which comprises the steps of circulating a non-oxidizing, inert, cold gas in a continuous stream and in a continuously gaseous state through a freezing chamber and maintaining the temperature of said gas in the chamber between substantially $-10°$ F. and $-50°$ F., discharging into said cold gas stream in the chamber fruit juice in discrete droplets which are substantially all smaller than 500 microns in diameter and which freeze individually substantially intaneously upon contact with said gas, and collecting and compacting the frozen juice droplets.

4. The method of claim 3 further comprising the step of applying a predetermined above-atmospheric pressure to said fruit juice and cooling the fruit juice while under said pressure to a temperature which is below its atmospheric pressure freezing point, but above its freezing point at said above-atmospheric pressure, prior to discharging the fruit juice into said cold gas stream in the freezing chamber.

5. A method of freezing fruit juice which comprises the steps of discharging into a freezing chamber fruit juice in small individual droplets, and contacting said droplets as they enter sair chamber with a non-oxidizing, inert, cold gas in a gaseous state at a temperature between substantially $-10°$ F. and $-50°$ F. to freeze the droplets individually.

References Cited in the file of this patent

UNITED STATES PATENTS

| | | |
|---|---|---|
| 1,398,081 | Merrell | Nov. 22, 1921 |
| 1,976,204 | Voorhees et al. | Oct. 9, 1934 |
| 2,020,719 | Bottoms | Nov. 12, 1935 |
| 2,412,203 | Brunkhurst | Dec. 10, 1946 |
| 2,750,998 | Moore | June 19, 1956 |
| 2,876,111 | Holzcker | Mar. 3, 1959 |